US012108504B2

(12) United States Patent
Lin et al.

(10) Patent No.: US 12,108,504 B2
(45) Date of Patent: Oct. 1, 2024

(54) THREE CHANNEL LED CONTROL FOR COLOR AND WHITE LIGHT PERFORMANCE IN LIGHTING STRANDS

(71) Applicant: Tivoli, Inc., Irvine, CA (US)

(72) Inventors: Lien-Chung Lin, Brea, CA (US); Bey Shing Jang, Santa Ana, CA (US)

(73) Assignee: Tivoli, Inc., Irvine, CA (US)

( * ) Notice: Subject to any disclaimer, the term of this patent is extended or adjusted under 35 U.S.C. 154(b) by 493 days.

(21) Appl. No.: 17/534,975

(22) Filed: Nov. 24, 2021

(65) Prior Publication Data

US 2022/0338320 A1 Oct. 20, 2022

Related U.S. Application Data

(60) Provisional application No. 63/175,812, filed on Apr. 16, 2021.

(51) Int. Cl.
*H05B 45/20* (2020.01)
*F21S 4/10* (2016.01)
(Continued)

(52) U.S. Cl.
CPC ................ *H05B 45/20* (2020.01); *F21S 4/10* (2016.01); *F21V 23/001* (2013.01); *F21Y 2113/17* (2016.08); *F21Y 2115/10* (2016.08)

(58) Field of Classification Search
None
See application file for complete search history.

(56) References Cited

U.S. PATENT DOCUMENTS

2002/0176257 A1 11/2002 Cummings et al.
2008/0219612 A1* 9/2008 Smith ................ F16C 33/7889 384/624

(Continued)

FOREIGN PATENT DOCUMENTS

CN 30482718 S 9/2018
EP 2311025 B1 9/2015

(Continued)

OTHER PUBLICATIONS

Cablematric—Description and Specification for Garland Lamp Holder E27 for Rectangular Wire 6X10 MM. 2 pages. Accessed on Feb. 25, 2022. Retrieved from https://cablematric.com/en/products/garland-lamp-holder-e27-for-rectangular-wire-6x10-mm-NT049.

(Continued)

*Primary Examiner* — Crystal L Hammond
(74) *Attorney, Agent, or Firm* — Kilpatrick Townsend & Stockton LLP

(57) ABSTRACT

A data box generates an output signal to control a light strand comprising a plurality of lights. The data box is configured to receive an input signal comprising a first instruction packet having a first, second, and third color value. The data box is further configured to determine an output color based on the first, second, and third color values. The data box then generates the output signal, which comprises a second instruction packet. The second instruction packet comprises a first, second, and third color value as well as a white value. The combination of the first, second, third, and white values is configured to match the output color of the first instruction packet. The data box is further configured to transmit the second instruction packet to a light of the plurality of lights.

20 Claims, 7 Drawing Sheets

(51) Int. Cl.

| | |
|---|---|
| ***F21V 23/00*** | (2015.01) |
| ***F21Y 113/17*** | (2016.01) |
| ***F21Y 115/10*** | (2016.01) |

(56) References Cited

U.S. PATENT DOCUMENTS

| | | | | |
|---|---|---|---|---|
| 2009/0085861 | A1* | 4/2009 | Lee | G09G 3/342 345/102 |
| 2011/0210677 | A1 | 9/2011 | Hering et al. | |
| 2013/0028260 | A1* | 1/2013 | Mushano | G06F 9/3858 370/392 |
| 2018/0327096 | A1* | 11/2018 | Lins | B60Q 3/43 |
| 2019/0075632 | A1* | 3/2019 | Isele | H05B 45/397 |
| 2019/0341718 | A1 | 11/2019 | Yu | |
| 2021/0153315 | A1 | 5/2021 | Yu | |
| 2021/0156530 | A1 | 5/2021 | Huang | |
| 2021/0366391 | A1* | 11/2021 | Wei | G09G 3/3208 |

FOREIGN PATENT DOCUMENTS

| | | | |
|---|---|---|---|
| KR | 20170034307 | A | 3/2017 |
| WO | 2019090810 | A1 | 5/2019 |

OTHER PUBLICATIONS

Builders SA—Create Your Own Rope Lights—DIY. 2 pages. Accessed on Feb. 25, 2022. Retrieved from https://sv-se.facebook.com/BuildersSA/videos/265707631802790/?video_source=permalink.

Product Description: Wireless RGBW 4 Channel LED Controller with Channel Pairing, aspect LED, a Wilson Tool Company, accessed on Apr. 21, 2022, retrieved from https://www.aspectled.com/collections/led-controllers/products/wireless-rgbw-4-channel-led-controller-channel-pairing?gclid=Cj0KCQiAhP2BBhDdARIsAJEzXIEEQB1WyBFteLqsFIAkdQN20FqW2fl-dKebk1pWLFZZSa3G9FIULUMaAofrEALw_wcB 3 pages.

* cited by examiner

THREE CHANNEL LED CONTROL FOR COLOR AND WHITE LIGHT PERFORMANCE IN LIGHTING STRANDS

CROSS-REFERENCES TO RELATED APPLICATIONS

This application claims priority to U.S. Provisional Application No. 63/175,812, filed on Apr. 16, 2021, entitled "THREE CHANNEL LED CONTROL FOR COLOR AND WHITE LIGHT PERFORMANCE IN LIGHTING STRANDS," which is incorporated by reference for all purposes.

BACKGROUND

This application generally relates to lighting, and without limitation to outdoor lighting. Light strands, including string lights, fairy lights, and holiday lights (e.g., Christmas tree lights), can be used for lighting or decoration. Light strands generally contain a plurality of electric lights equally spaced on cable, wire, or string. String lights often comprise a transparent bulb hanging from a cable (e.g., used to illuminate an area below them). Fairy lights are often smaller and in closer proximity than lights on a string light. Lights on a light strand can be the same or different colors.

SUMMARY

Various embodiments are described related to a system for three channel Light Emitting Diode (LED) control for color and white light performance in lighting strands. In some embodiments, a system for three channel LED control is described. The system may comprise a light strand comprising a plurality of lights. The system may further comprise a data box. The data box may be configured to receive an input signal comprising a first instruction packet having a first color value, a second color value, and a third color value. The data box may be further configured to determine an output color based on the first color value, the second color value, and the third color value of the instruction packet. The data box may further be configured to generate an output signal comprising a second instruction packet. The second instruction packet may comprise a first color value, a second color value, a third color value, and a white value, wherein a combination of the first color value, the second color value, the third color value, and the white value of the second instruction packet is configured to match the output color of the first instruction packet. The data box may further be configured to transmit the second instruction packet to a light of the plurality of lights.

In some embodiments, the first instruction packet is an asynchronous serial data packet according to a DMX512 protocol and the first color value of the first instruction packet comprises a magnitude for a red color, the second color value of the first instruction packet comprises a magnitude for a green color, and the third color value of the first instruction packet comprises a magnitude for a blue color. In some embodiments, the first color value of the second instruction packet comprises a magnitude for a red color, the second color value of the second instruction packet comprises a magnitude for a green color; the third color value of the second instruction packet comprises a magnitude for a blue color; and the white value comprises a magnitude for white.

In some embodiments, each light of the plurality of lights is individually addressed. In some embodiments, the first instruction packet comprises an address of one of the individually addressed lights, and the second instruction packet includes the address. In some embodiments, each light of the plurality of lights comprises an RGB LED and a white LED. Each light may further be configured to receive the second instruction packet from the data box. Each light may further be configured to translate the first color value of the second instruction packet into a red signal, the second color value of the second instruction packet into a green signal, the third color value of the second instruction packet into a blue signal, and the white value into a white signal. Each light may be further configured to transmit the red signal to a red input on the RGB LED, the green signal to a green input on the RGB LED, the blue signal to a blue input on the RGB LED, and the white signal to an input on the white LED. In some embodiments, each of the red, green, blue, and white signals is pulse width modulated.

In some embodiments, each light of the plurality of lights is mounted in a separate housing and each housing has a separate transparent, or semi-transparent, enclosure. In some embodiments, each light of the plurality of lights comprises a circuit board. In some embodiments, the light strand comprises four wires electrically coupling the plurality of lights in parallel with the data box. The four wires may comprise a plus wire, a minus wire, a clock wire, and a signal wire.

In some embodiments, the light strand is a first light strand and the system further comprises a second light, comprising a second plurality of lights, coupled with the first light strand. In some embodiments, the data box is configured to receive the input signal from a personal computer based on input from a user. Embodiments of such a system may further comprise a server coupled with the data box, the server being configured to receive the first instruction packet from a personal computer and transmit the first instruction packet to the data box.

In some embodiments, when the first color value of the first instruction packet, the second color value of the first instruction packet, and the third color value of the first instruction packet are each at a maximum value, the first color value of the second instruction packet, the second color value of the second instruction packet, and the third color value of the second instruction packet are each zero, and the white value is greater than zero. In some embodiments, the first instruction packet further comprises a brightness value indicating a desired output power for the light of the plurality of lights.

In some embodiments, the second instruction packet further comprises a brightness value. In some embodiments, each light of the plurality of lights is configured to receive the second instruction packet and translate the brightness value into a pulse width modulation value to be outputted by the light.

In some embodiments, a method for controlling LED lights using three channels is described. The method may comprise receiving, by a processor of a light control system, an input signal. The input signal may comprise a first instruction packet having a first color value, a second color value, and a third color value. The method may comprise determining, by the processor, an output color based on the first color value, the second color value, and the third color value of the first instruction packet. The method may comprise generating, by the processor, an output signal comprising a second instruction packet. The second instruction packet may comprise a first color value, a second color value, a third color value, and a white value. A combination of the first color value, the second color value, the third color value, and the white value of the second instruction packet may be configured to match the output color of the first instruction packet. The method may comprise transmitting, by the processor, the second instruction packet to a light having an RGB LED and a white LED.

Embodiments of such a method may include one or more of the following features: the first instruction packet is an asynchronous serial data packet according to a DMX512 protocol; the first color value of the first instruction packet comprises a magnitude for a red color; the second color value of the first instruction packet comprises a magnitude for a green color; and the third color value of the first instruction packet comprises a magnitude for a blue color.

Embodiments of the method may also include one or more the following features: the first instruction packet further comprises an address of a specific light from a plurality of lights coupled with the one or more processors; the second instruction packet includes the address; when the output color is determined to be white, the white value is a value greater than zero; and the second instruction packet further comprises a value indicating a desired brightness setting of the light.

In some embodiments, the method may further comprise receiving, by a plurality of lights coupled with the processor, the second instruction packet from the one or more processors. The method may further comprise translating, by each light of the plurality of lights, the second instruction packet into an RGB signal and a white signal. The method may further comprise transmitting, by each light of the plurality of lights, the RGB signal to an RGB LED of the light, and the white signal to a white LED of the light.

In some embodiments, each light of the plurality of lights is associated with an address. The method may further comprise, identifying, by each light of the plurality of lights, the color values in the second instruction packet addressed to the address associated with the light.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DESCRIPTION

Embodiments relate to controlling lights (e.g., lighting strands) with both color and white components using three channels. Some lights use colored LEDs (e.g. RGB) to provide light across a variety of colors, including white. A benefit of using an RGB LED is that light is often thought of as a combination of three values (e.g., red, green, and blue). However, when attempting to create white light using an RGB LED, the RGB LED may not be able to produce a true white color using the combination of red, green, and blue light. Instead, the light may appear to have a blue tint to it. To overcome this off-white appearance, a light may include a white LED (e.g., using phosphor coatings) in addition to colored LEDs. However, controlling a white LED, in addition to controlling colored LEDs, often uses an additional input to control the white LED (e.g., uses four inputs instead of three inputs), thereby making it more complex to control. Accordingly, converting control signals with three values into four values, (e.g., and while producing true white light) can help reduce the complexity of controlling lights with both colored LEDs and white LEDs.

Figure 1:
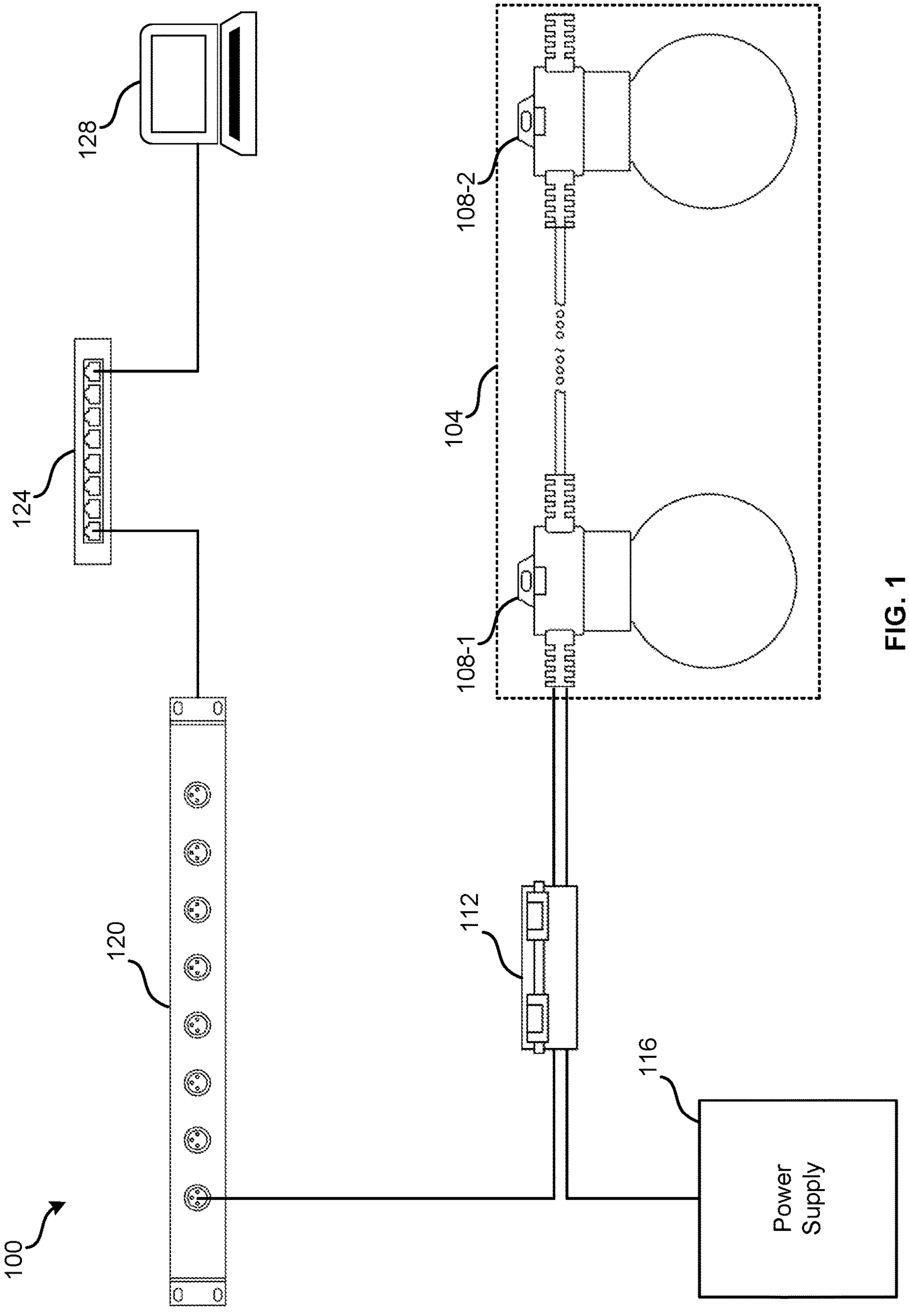
FIG. 1 illustrates a system for Light Emitting Diode (LED) control, in accordance with some embodiments.

FIG. 1 illustrates a system 100 for three channel Light Emitting Diode (LED) control, in accordance with some embodiments. The system 100 may include: a light strand 104; a data box 112; a power supply 116; a lighting control interface 120; a network device 124; and a computer 128. The light strand 104 may be coupled with the data box 112. The data box 112 may be connected to the power supply 116. The data box 112 may also be connected via one or more devices to the computer 128. In some embodiments, the system 100 is in a live control performance setup (e.g., used for concerts or performance-based light manipulation). In some embodiments, the system 100 is used to provide lighting displays. For example, the system 100 can produce complex light shows or displays using one or more light strands, such as light strand 104.

The light strand 104 may include one or more lights 108. For example, the light strand 104 may have at least, 2, 5, 10 or more lights. As another example, the light strand 104 may have fewer than 200, 100, 50, or fewer lights. A light 108 may include a housing, a light source, a computer chip or microprocessor, and/or memory, as further described in relation to FIG. 5. In some embodiments, the light strand 104 comprises wires (e.g., four wires) electrically coupling the one or more lights 108 in parallel or in series with data box 112. For example, the data box 112 may be connected with a first light 108-1, which may further be connected in parallel with a second light 108-2. In some embodiments, some of the wires carry electrical signals representing digital data. For example, two wires may be used to provide differential signaling, such as an RS-485 standard signal, with a positive data wire and a negative data wire for supplying power. As another example, one wire may be used to provide a lighting control signal while another wire may be used to provide an address signal. In some embodiments, wires are used to supply electricity to power each light 108 of light strand 104. For example, two wires may be used to provide DC or AC electricity to light strand 104.

Figure 2:
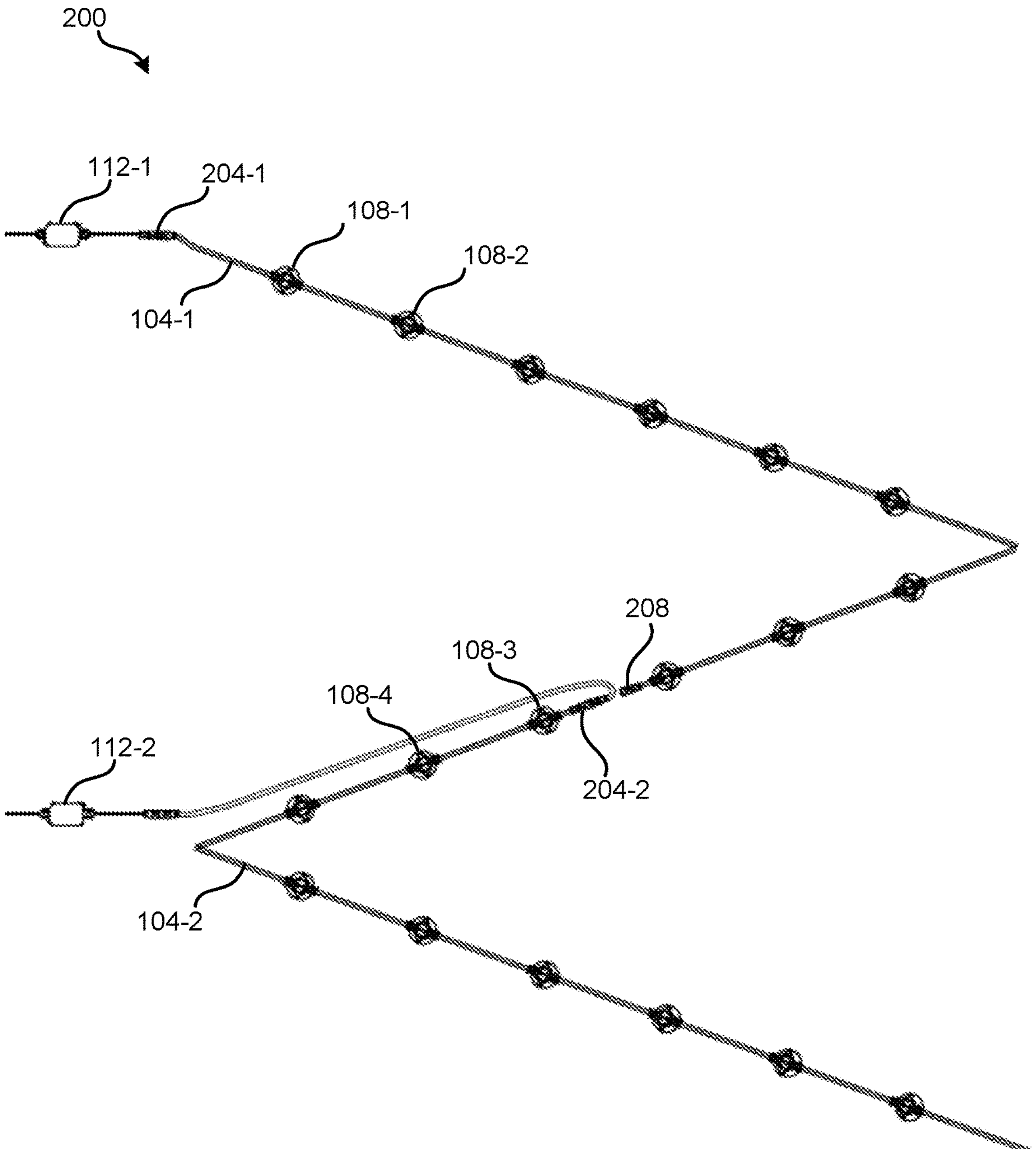
FIG. 2 illustrates a system configured to control multiple light strands, in accordance with some embodiments.

In some embodiments, light strand 104 may be coupled with one or more other light strands, as described further in relation to FIG. 2. Light strand 104 may be suspended from a structure. For example, light strand 104 could be suspended using a variety of hanging tools from a patio, ceiling, pagoda, etc. Light strand 104 may also be mounted to a surface. For example, light strand 104 could be mounted to a wall or display surface (e.g., in a pattern).

Each light 108 of light strand 104 includes a light source, such as one or more LEDs, configured to emit light across a range of wavelengths in the visible light spectrum, in addition to producing what appears to be true white light, as described below in relation to FIG. 4. In some embodiments, each light 108 emits light in response to a lighting instruction. A lighting instruction may include a desired output color for a light to emit. For example, a desired output color may be blue, pink, purple, white, teal, or other color, or mixture of colors, perceivable by the human eye. In some embodiments, the desired output color may be represented as a single value. For example, a lighting instruction may include a color code, such as a hexadecimal color code, or a value corresponding to a specific wavelength of light. In some embodiments, the desired output color may be represented as a combination of values. For example, a lighting instruction may include one or more values corresponding to the intensity of one or more colors, such as red, green, and blue. As another example, the lighting instruction may include values corresponding to the intensity and/or magnitude of a red color, a green color, a blue color, and white, which when combined by light 108, may cause light 108 to emit the desired color.

In some embodiments, lighting instructions include a plurality of individual lighting instructions for multiple desired output colors. For example, a lighting instruction may include a first instruction for a desired output color intended for the first light 108-1 of the light strand 104, and a second instruction for a desired output color intended for the second light 108-2 of the light strand 104. In some embodiments, each of the instructions for the desired output colors in the lighting instructions are mapped to an address. For example, lighting instructions may have a first instruction for a first desired output color mapped to a first address corresponding to the first light 108-1 of the light strand 104 and a second instruction for a second desired output color may be mapped to a second address corresponding to the second light 108-2 of the light strand 104. Thus lights 108 can be individually addressed and/or dynamically controlled.

In some embodiments, the light strand 104 is configured to receive lighting instructions from a lighting control device, such as the data box 112. For example, the light strand 104 may receive one or more lighting instructions from the data box 112 via a control signal. In some embodiments, lighting instructions are received using wired or wireless data communications. For example, the light strand 104 may receive lighting instructions using one or more data wires. As another example, each light 108 of the light strand 104 may use a wireless communication protocol, such as Bluetooth, WiFi, or Mesh network communication to receive lighting instructions. In some embodiments, the lighting instruction is received as asynchronous serial data. For example, each light 108 of the light strand 104 may receive a series of bits conforming to a recognized standard, such as DMX512, and parse the bits into the intended lighting instruction. In some embodiments, light strand 104 is configured to receive a stream of lighting instructions. For example, the light strand 104 may receive multiple lighting instructions on a periodic basis or at regular intervals of time from the data box 112. In some embodiments, the stream of lighting instructions causes each light 108 of the light strand 104 to emit a different wavelength, or combination of wavelengths, of light per lighting instruction. In some embodiments, the stream of lighting instructions produces a complex light display. For example, a stream of lighting instructions may be configured to produce a variety of colors in time with music or videos.

Figure 3:
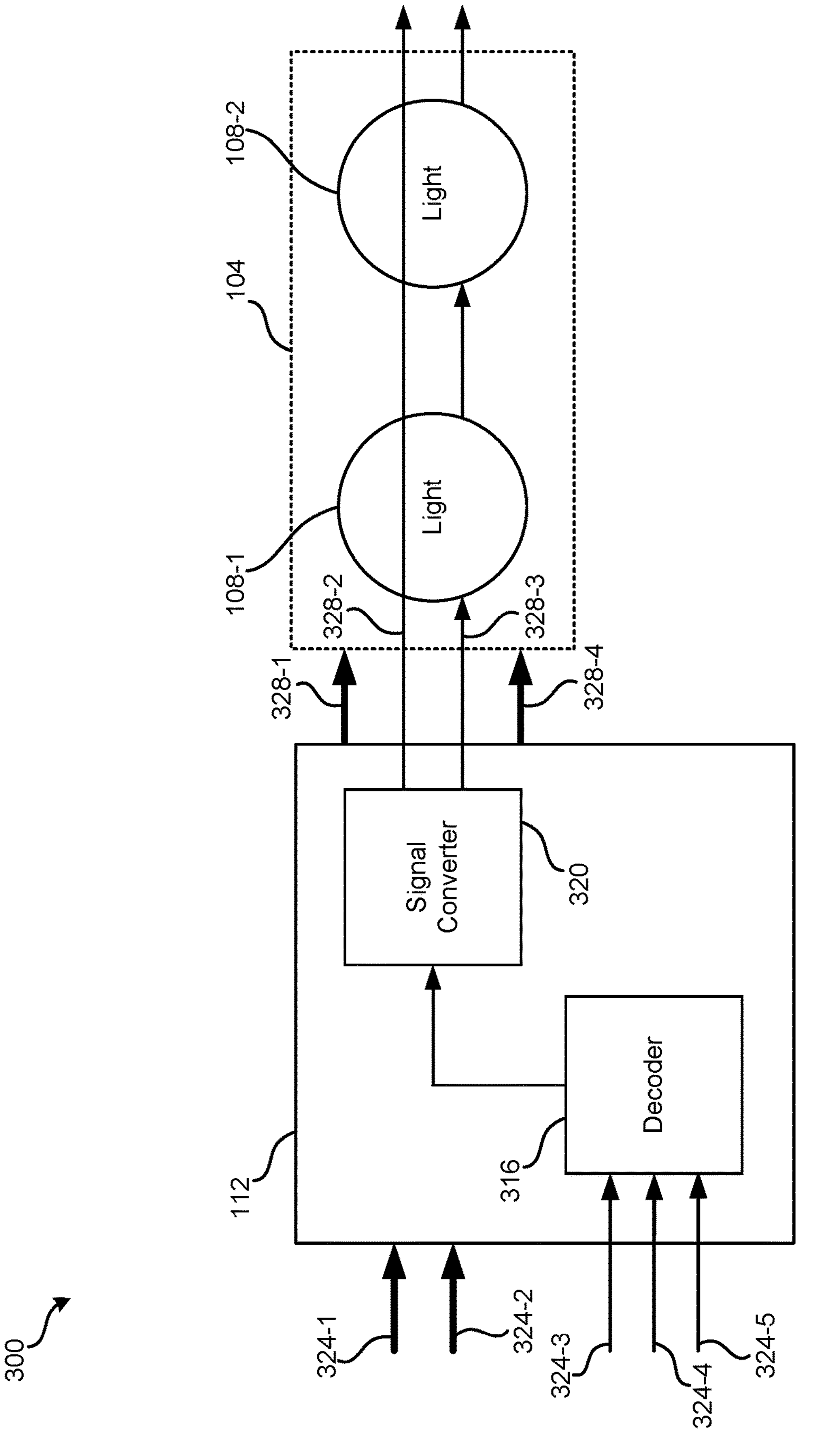
FIG. 3 illustrates a simplified block diagram of a system for three channel LED light control, in accordance with some embodiments.

The data box 112 can include one or more processors configured to perform various functions, such as control LED lights using three or more channels, as further described in relation to FIG. 3. The data box 112 can include one or more connectors. In some embodiments, the data box 112 includes one or more input connectors. For example, the data box 112 may include an input connector to receive electricity to power the one or more processors. As another example, the data box 112 may include an input connector to receive an input signal, such as light control signals or instruction packets. In some embodiments, the data box 112 has one input connector to receive both electricity and an input signal. For example, the data box 112 may include a 5 pin M16 connector where some of the pins are coupled with an external power supply and other pins are coupled to a source of lighting instructions, such as the computer 128.

In some embodiments, the data box 112 includes one or more output connectors. For example, the data box 112 may include an output connector that can be coupled with the light strand 104. In some embodiments, one or more of the output connectors provides electricity to a lighting device, such as the light strand 104. For example, the output connector may transmit electricity to power each light 108 of the light strand 104. In some embodiments, one or more of the output connectors provides an output signal, such as light control signals or lighting instruction packets, to a lighting device. For example, the output connector may transmit one or more output signals from the data box 112 to the light strand 104 with a plurality of instructions for each light 108 of the light strand 104 to produce a specific wavelength, or combination of wavelengths, of light output. In some embodiments, the data box 112 has one output connector to provide both electricity and lighting instructions to a lighting device. For example, the output connector may include a 4 pin M16 connector where a subset of the pins transmits enough electricity to power the light strand 104 while another subset of the pins transmits an output signal, such as serial data, as described in relation to FIG. 3.

In some embodiments, the data box 112 is configured to receive lighting instructions to control a lighting device. For example, the data box 112 may receive one or more lighting instructions from the computer 128 to control the one or more lights 108 of the light strand 104. In some embodiments, the lighting instructions are received as an input signal. For example, the data box 112 may receive a stream of asynchronous serial data through an input connector. In some embodiments, the asynchronous serial data includes one or more instruction packets. For example, the data box 112 may receive a stream of asynchronous serial data comprising multiple instruction packets.

In some embodiments, the data box 112 is configured to modify lighting instructions. For example, as further discussed in relation to FIG. 3, the data box 112 may receive an input signal from the computer 128 and generate a corresponding output signal to the light strand 104. In some embodiments, the data box 112 is configured to translate lighting instructions having only three color values (e.g., red, green and blue) into a lighting instruction packet including a fourth value (e.g., white), as described further in relation to FIG. 3.

In some embodiments, the data box 112 includes a power converter to convert AC electricity into DC electricity. For example, the data box 112 may be connected to a wall outlet providing 110V AC power and may use a converter to convert the AC electricity into DC electricity in order to power one or more processors. In some embodiments, the data box 112 receives DC electricity from an external power supply and/or power converter. For example, an input connector may include a positive and negative pin coupling the data box 112 to the power supply 116. In some configurations, the power supply 116 is part of the data box 112.

The computer 128 may be a smartphone, tablet computer, laptop computer, desktop, server, or similar computerized device. The computer 128 may be configured to control lighting devices, lighting control devices, and/or lighting control interfaces. In some embodiments, the computer 128 is coupled with one or more lighting control devices. For example, computer 128 is coupled with the data box 112. As another example, the computer 128 may be coupled with the data box 112 via the lighting control interface 120, such as an Artnet to DMX interface. In some embodiments, computer 128 is connected to a network. For example, computer 128 may be connected via wired and/or wireless connection with the network device 124, such as an Ethernet switch and/or wireless router. In some embodiments, computer 128 is connected to multiple lighting control devices through a wired or wireless network. For example, computer 128 may be in network communication with multiple lighting control interfaces, such as the lighting control interface 120. Further, each lighting control interface may be coupled with multiple lighting control devices, such as the data box 112. In some embodiments, the system 100 includes one or more servers. For example, a server may be connected to one or more computers, such as computer 128, to receive multiple lighting instructions and distribute the lighting instructions to one or more lighting control devices with or without the use of some combination of lighting control interfaces.

In some embodiments, computer 128 includes one or more applications configured to control lighting devices. For example, the one or more applications may execute lighting programs. A lighting program may be a collection of lighting instructions that is transmitted to a lighting device upon execution of the lighting program. In some embodiments, the lighting program may have multiple collections of lighting instructions. For example, one lighting program may have a first collection of lighting instructions configured for a first lighting device and a second collection of lighting instructions configured for a second lighting device. In some embodiments, the multiple collections of lighting instructions of a lighting program are transmitted to different lighting devices at the same time and/or in close temporal proximity as part of the execution of a lighting program. For example, upon execution of a lighting program by an application, the application may control a first lighting device and a second lighting device in tandem by transmitting a first collection of lighting instructions to the first lighting device at the same time as a second collection of lighting instructions is transmitted to the second lighting device.

In some embodiments, computer 128 stores and/or executes one or more lighting programs. For example, computer 128 may include multiple predefined lighting programs accessible by the one or more applications. In some embodiments, the one or more applications are configured to receive inputs from a user. For example, a user may be able to select from one or more predefined lighting programs accessible to an application. After selecting one of the predefined lighting programs, the user may instruct the application to execute the lighting program, causing a lighting device to operate in accordance with the lighting program. As another example, a user may be able to create and store new lighting programs using an application, such as MADRIX software. In some embodiments, the one or more applications allow a user to manually control a lighting device. For example, a user may create a lighting instruction and cause the application to transmit the lighting instruction to a lighting device, such as light strand 104, to preview the lighting instruction.

In some embodiments, computer 128 transmits the lighting programs and/or lighting instructions to a lighting device in the form of datagrams using one or more protocols, such as Art-Net and/or TCP/IP. For example, computer 128 may encapsulate and transmit an Art-Net data packet using TCP/IP to the network address of the lighting control interface 120, such as an Artnet-DMX converter. The Artnet-DMX converter may then convert the Art-Net data packet into a separate data protocol, such as DMX512 serial data, and transmit the serial data to a lighting control device, such as the data box 112. The lighting control device, such as the data box 112, may then modify and/or transmit the serial data to a lighting device, such as the light strand 104.

FIG. 2 illustrates a system 200 configured to control light performance of multiple light strands, in accordance with some embodiments. The system 200 may include multiple data boxes 112 and multiple light strands 104. The data boxes 112 may be the same or function in a similar manner as described above in relation to FIG. 1. The light strands 104 may be the same or function in a similar manner as described above in relation to FIG. 1. For example, each light strand 104 may include one or more lights 108. The lights 108 may be the same, or function in a similar manner as described above in relation to FIG. 1. In some embodiments, system 200 includes 1, 2, 4, or more light strands and 15, 10, 5, or fewer light strands. The system 200 may also include one or more computerized devices capable of controlling multiple light strands, such as computer 128 as discussed above in relation to FIG. 1. The system 200 may include one or more lighting control interfaces capable of converting lighting instructions in one format to another format, such as lighting control interface 120 as discussed above in relation to FIG. 1.

In some embodiments, each light strand 104 of system 200 may be connected in series to a single data box 112. For example, a first data box 112-1 may be coupled to a leading end 204-1 of a first light strand 104-1, and a tail end 208 of the first light strand 104-1 may be coupled to a leading end 204-2 of a second light strand 104-2. In this example, the first data box 112-1 may provide lighting instructions for each light 108 of the first light strand 104-1 and the second light strand 104-2. In some embodiments, the system 200 includes one data box 112 for each light strand 104. For example, the first data box 112-1 and a second data box 112-2 may both be coupled with a source of lighting instructions, the first data box 112-1 may be coupled to the leading end 204-1 of the first light strand 104-1, and the second data box 112-2 may be coupled to the leading end 204-2 of the second light strand 104-2.

In some embodiments, each light 108 of the multiple light strands 104 has a unique address. For example, if each light strand 104 has 20 lights 108, a first light 108-1, a second light 108-2, etc. of the first light strand 104-1 may have addresses from 1-20 and a third light 108-3, a fourth light 108-4, etc. of the second light strand 104-2 may have addresses from 21-40. In some embodiments, the number of lights 108, or light strands 104, may be limited by the available address space of lighting instruction packets. For example, if a lighting instruction packet, as described above in relation to FIG. 1, can support up to 100 unique addresses, up to five light strands 104, with 20 uniquely addressed lights 108, may be connected to the same source of lighting instructions. In some embodiments, multiple lighting control devices, such as the data boxes 112, may be used to expand the system 200 where the amount of available addresses is limited. For example, when overlapping addresses cannot be avoided, the first data box 112-1 may be coupled with the first light strand 104-1, the second data box 112-2 may be coupled with the second light strand 104-2, and the first data box 112-1 and second data box 112-2 each receive separate collections of lighting instructions with the same addresses.

In some embodiments, the number of lights 108 per light strand 104 is determined by the available power source. For example, one power source may be capable of providing enough power for 20 lights 108 while another power source may be capable of providing enough power for 80 lights 108. In some embodiments, both the number of lights 108 in light strand 104, and the number of light strands 104 that may be connected in series are determined by the available power source. For example, the first data box 112-1 may be able to provide power for 80 lights. In this case, the first data box 112-1 could be connected to a first light strand 104-1 comprising 80 lights. Similarly, the second data box 112-2 could be connected in series to 1, 2, 3, or 4 light strands 104 with 20 lights per strand. It should be understood that a similar combination of light strands with varying numbers of lights may be used in series with a single data box based on the available power from that data box.

In some embodiments, lights 108 are equally spaced on the light strand 104. In some embodiments, the lights 108 are not equally spaced. For example, lights 108 could be progressively closer together. Lights 108 can be closer together (e.g., linearly, or exponentially) from the tail end 208 to the leading end 204, or vice versa, to create a specific visual effect (e.g., for more consistent illumination of an area and/or serially activating the lights to create a dynamic effect). For example, multiple light strands 104 could be hung in a circular gazebo to extend radially from a center of the gazebo. Lights 108 could be closer together at the tail end 208 to provide more light near a perimeter of the gazebo since light strands are farther apart from each other at the perimeter, which can provide more consistent lighting in the gazebo. In some embodiments, lights are progressively closer together from a center of the light strand 104 to the ends.

FIG. 3 illustrates a simplified block diagram of an embodiment of a system 300 for three channel LED light control. The system 300 includes a data box 112 and a light strand 104. The system 300 also includes one or more computers, such as the computer 128 as described in relation to FIG. 1, and one or more light control interfaces, such as the light control interface 110 as described in relation to FIG. 1. The light strand 104 may include one or more lights 108, and may function as described in relation to FIG. 1.

The data box 112 may include: a decoder 316; a signal converter 320; inputs 324; and outputs 328. The inputs 324 are connectors into the data box 112 and include a five pin input. A first input 324-1 and a second input 324-2 may be configured to be connected to a DC power source, such as the power supply 116, as described above in relation to FIG. 1. The first input 324-1 may be configured to receive 24 volts DC into the data box 112, and the second input 324-2 may be configured to provide a connection from the data box 112 to a ground. A third input 324-3, a fourth input 324-4, and a fifth input 324-5, may be configured to receive a DMX512 data transmission. The outputs 328 are connectors out of the data box 112 and include a four pin output. A first output 328-1 may be configured to provide electrical power to the light strand 104. A second output 328-2 may be configured to provide a data control signal to each light 108 of the light strand 104. A third output 328-3 may be configured to provide an address signal to each light 108 of the light strand 104. A fourth output 328-4 may be configured to provide a shared negative (e.g., ground) for each light 108 of the light strand 104.

The data box 112 may be configured to receive an input signal. The input signal may include one or more asynchronous serial data packets according to a DMX512 standard. For example, the input signal can be a differential signal transmitted over two data wires, such as the third input 324-3 and the fourth input 324-4. The one or more asynchronous serial data packets may include input lighting instruction packets. The input lighting instruction packets may include one or more color values. For example, there may be three color values comprising a magnitude for a red color, a green color, and a blue color. In some embodiments, the data box 112 may determine an output color based on the color values from an instruction packet. For example, the decoder 316 may determine, based on a combination of three color values for red, green, and blue, that the desired output color is pink, teal, purple, or other color perceivable by the human eye.

The data box 112 may convert the input signal into an output signal. The output signal may be a control signal including one or more output lighting instruction packets. In some embodiments, the signal converter 320 may implement an algorithm to convert input instruction packets having red, green, and blue values into output instruction packets having red, green, blue, and white values. For example, the output instruction packets may have color values comprising magnitudes for a red color, a green color; a blue color; and white. Such an algorithm may reduce the complexity of controlling lights and/or produce a wider array of colors and true white light. For example, an algorithm intended for lights using only RGB LEDs (e.g., three channels, one channel each for red, green, and blue) can be used to produce a wider array of colors and true white light using a light with both RGB LEDs and white LEDs (e.g., four channels, the fourth channel being white). As an additional example, the algorithm may convert an instruction packet with the first, second, and third color values at a maximum value into an instruction packet with the first, second, and third color values at a minimum value and a white value at a maximum value corresponding to true white light. True white light can refer to white on a blackbody radiation curve.

In some embodiments, the control signal is transmitted on a single line at a higher voltage than the differential signal received on two lines. In some embodiments, multiple lights may be connected in parallel to the single control signal. For example, as illustrated by FIG. 3, the first light 108-1 and the second light 108-2 may be connected in parallel to the control signal from the data box 112. By connecting lights in parallel, the risk of a defective or malfunctioning light and/or light source affecting the remainder of the system can be reduced or eliminated. In some embodiments, higher resistance in a light 108 is used to read the control signal with a higher voltage than a DMX512 signal. Using a higher output control signal compared to the input signal can reduce the risk of a defective or malfunctioning light and/or light source affecting the remaining fixtures of the system. In addition, as the voltage is increased, less current will be transmitted resulting in a lower voltage drop at each light, which can increase the distance for data transmission.

In some embodiments, the data box 112 transmits an address signal to each light 108 of the light strand 104. The address signal may automatically set the address for each light 108 (e.g., setting an address in series). For example, when the power to the data box 112 is turned on, an initial address may be sent from the data box 112 to the first light 108-1. The first light 108-1 may then receive and store the initial address in a memory. After storing the address in memory, the first light 108-1 may then create a new address. The new address can be an increment of the initial address (e.g., new address="initialAddress+1"). The new address may then be sent from the first light 108-1 to the second light 108-2 (e.g., the address signal is connected to the lights in series). This process may be repeated by each light 108 in a series until every light 108 has received and stored a unique address. In some embodiments, if a light does not receive an address signal from the previous light, it may keep a default parameter as its address or it may default to the last address stored in memory. This may occur, for instance, when the previous light and/or light source in the series is malfunctioning. If this is the case, the malfunctioning light and/or light source may be replaced and automatically receive a new address when the system is rebooted. By automatically generating addresses in this way, it may be unnecessary to manually set the address of an individual light, for example, when a replacement light and/or light source is installed.

In some embodiments, the unique address for each light 108 may be used in lighting instruction packets. For example, a lighting instruction packet may include an address field indicating which light the instructions are configured to control. In some embodiments, the instruction packet may have multiple address fields, each mapped to a desired output color. For example, a lighting instruction packet may have a first address field containing the unique address for the first light 108-1 mapped to a desired output color of pink, and a second address field containing the unique address for the second light 108-2 mapped to a desired output color of purple. When the first light 108-1 receives the lighting instruction packet, it may parse the address fields to identify its own unique address as well as the desired output color, pink. Further, when the second light 108-2 receives the lighting instruction packet, it may perform the same functions to identify the desired output color of purple. In some embodiments, the data box 112 receives an input instruction with one or more unique addresses for the lights 108 it is connected to, and generates an output instruction packet with the same one or more unique addresses.

In some configurations, the data box 112 includes application specific hardware. For example, the data box 112 comprises an application specific integrated circuit for converting an input instruction packet to an output instruction packet. In some embodiments, the data box 112 is configured to not connect to a monitor and/or does not contain user input connections (e.g., the data box 112 cannot be connected to a keyboard or mouse). By using application specific hardware, and/or by not having peripheral connections, the data box 112 can be more economically configured for certain environments (e.g., waterproofed for outdoor/wet environments). In some embodiments, the data box 112 comprises a water-resistant (e.g., water proof) housing.

Figure 4:
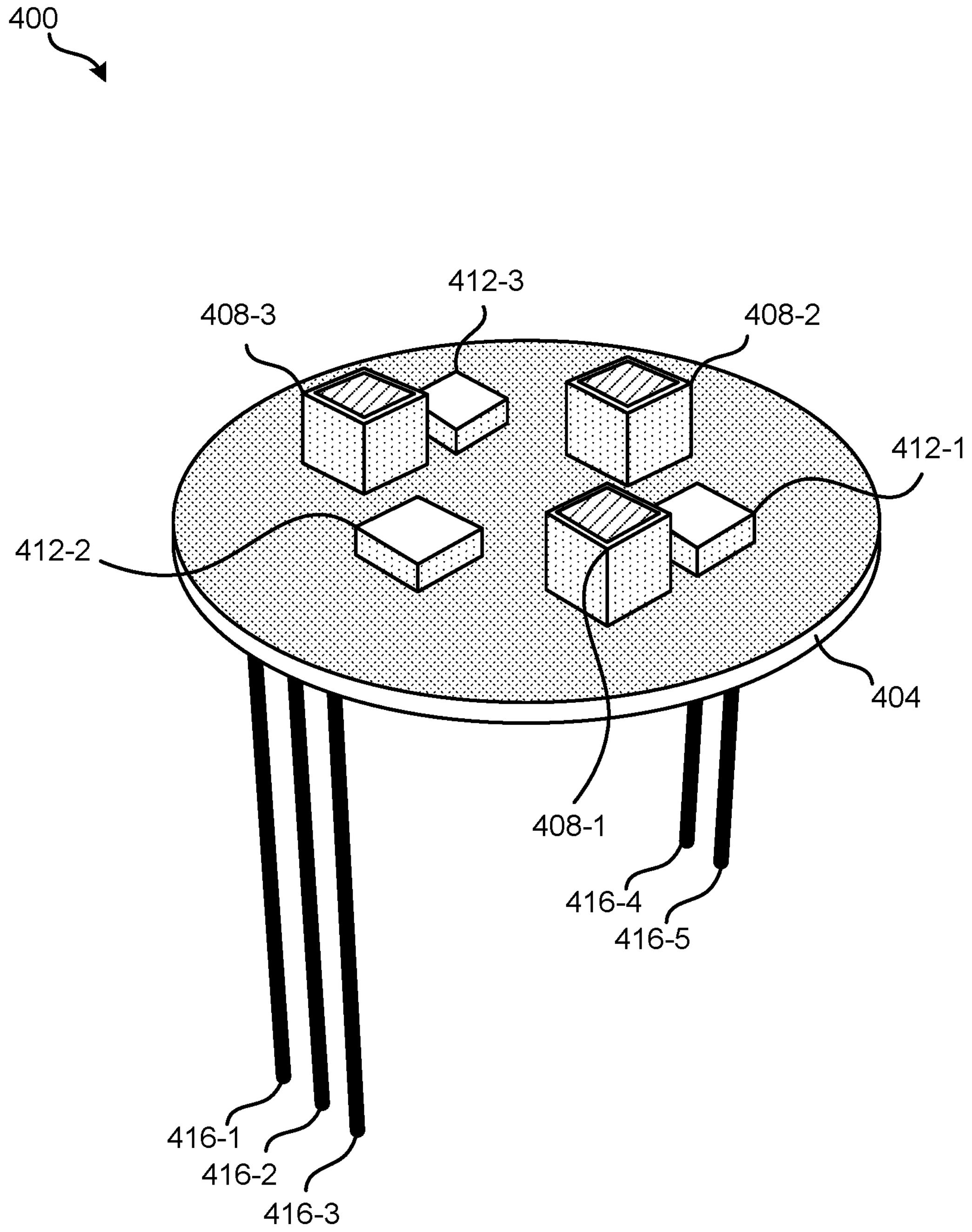
FIG. 4 illustrates a light source, in accordance with some embodiments.

FIG. 4 illustrates an embodiment of a light source 400. The light source 400 may include a circuit board 404, one or more RGB LEDs 408, one or more white LEDs 412, and one or more inputs 416. The circuit board 404 may be a printed circuit board, or similar electrical component capable of being coupled with, and coupling together, various other electrical components, such as LEDs, computer chips, etc. The light source 400 may also include a computer chip or other processor and/or a memory capable of storing and executing instructions to control the one or more RGB LEDs 408 and/or the one or more white LEDs 412. The light source 400 may be used by a light, such as light 108 as described in relation to FIG. 1, to emit light. In some embodiments, the use of a white LED may reduce the overall power output of a light while maintaining the same brightness as compared to using only RGB LEDs. For example, a mixed white color at full brightness using RGB LEDs may use 20 mA for red, 20 mA for green, and 20 mA for blue, thereby producing 40 lumens at a total power consumption of 0.16 Watts. Using a single white LED may deliver the same 40 lumens by using 50 mA at a total power consumption of 0.15 Watts. LED performance can differ based on manufacturer.

In some embodiments, the light source 400 controls one or more RGB LEDs 408 and/or one or more white LEDs 412, using multiple electrical signals. An electrical signal may be a DC signal, such as 2.5, 5, 10, or more volts DC. In some embodiments, the light source 400 uses four electrical signals. For example, the light source 400 may comprise a red signal, a green signal, a blue signal, and a white signal. In some embodiments, the electrical signals are transmitted to one or more inputs of one or more LEDs of the light source. For example, the one or more RGB LEDs 408 may receive the red, green, and blue signals via corresponding input leads or connections while the one or more white LEDs 412 may receive the white signal through a corresponding input lead or connection. In some embodiments, the signals are pulse-width modulated to achieve a desired intensity and/or brightness of a particular color based on the duty cycle of the signal. For example, a red signal transmitted to an RGB LED with a duty cycle of 75% may be perceived as a brighter shade of red than a red signal with a duty cycle of 50%. As another example, the duty cycles for the red and blue signals may be varied to achieve a complex color combination, such as pink, by transmitting a red signal with a relatively high duty cycle and a blue signal with a lower duty cycle to an RGB LED.

In some embodiments, the electrical signals are translated from lighting instruction packets comprising color values. For example, a lighting instruction packet transmitted from a light control device, such as the data box 112, as described above in relation to FIG. 1, may include color values corresponding to the intensity and/or magnitude of a red color, a green color, a blue color, and white. These color values may be translated into corresponding red, green, blue and white signals that may then be transmitted to one or more LEDs of the light source 400. In some embodiments, the lighting instruction packet further comprises a brightness value indicating a desired output power, brightness, and/or intensity. For example, the color values corresponding to the intensity and/or magnitude of red, green, blue, and white may also indicate the desired output power. In some embodiments, the values corresponding to the intensity and/or magnitude are used to determine the appropriate duty cycle for the corresponding pulse width modulated red, green, blue, and white signals. For example, the color values may be selected from a range of values, such as 0 to 255, and the appropriate duty cycle from 0 to 100% may be used to represent the values within that range. While 0 to 255 is used here by way of example, it should be understood that other suitable ranges of values may be used depending on various factors, such as the available signal generator, the available color fidelity output of the system, and/or the instruction packet size and/or length, among others.

In some embodiments, the color values are translated by a light, such as the light 108 described above in relation to FIG. 1. For example, the light 108 may receive a lighting instruction packet via a control signal wire, translate the color values of the instruction packet into the appropriate duty cycle values, and transmit the electrical signal pulse width modulated with the appropriate duty cycle to the one or more inputs 416 of the light source 400. Further, the one or more inputs 416 of the light source 400 may be coupled with one or more inputs and/or connections of the one or more RGB LEDs 408 and the one or more white LEDs 412, which then receive the electrical signals and cause the respective LED to emit light. In some embodiments, the light source 400 translates the color values. For example, the light source 400 may receive instruction packets, translate them into signals, and transmit them to the one or more RGB LEDs 408 and the one or more white LEDs 412.

Figure 5A:
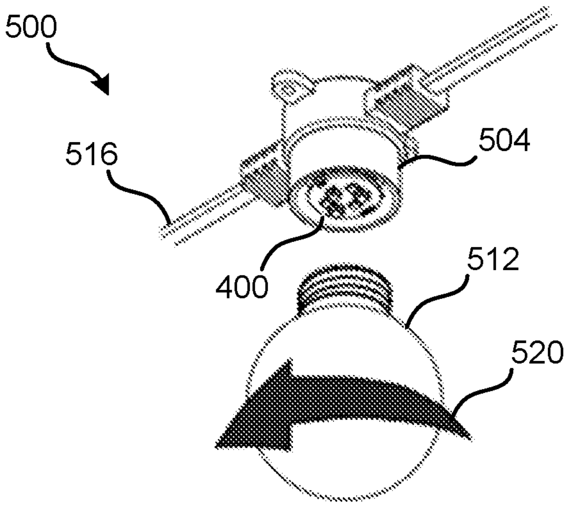
FIGS. 5A-5C illustrate a light assembly, in accordance with some embodiments.
Figure 5B:
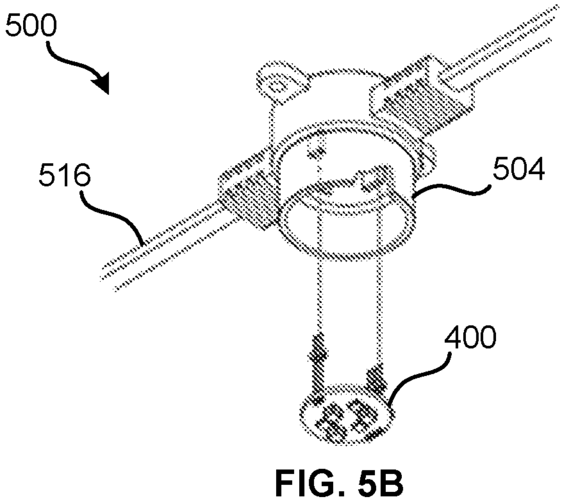
Figure 5C:
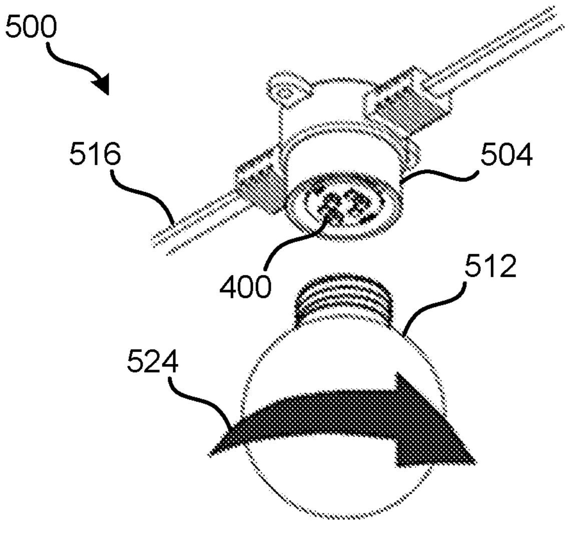

FIGS. 5A-5C illustrate an embodiment of a light assembly 500. The light assembly 500 may be one of many lights, such as light 108, connected in parallel to form a light strand, such as the light strand 104, as described above in relation to FIG. 1. The light assembly 500 may include a housing 504, a light source 400, an enclosure 512, and wires 516. The wires 516 may provide a combination of power, a control signal, and an address signal, to the light assembly 500, as described above in relation to FIG. 3. The light source 400 may function as described above in relation to FIG. 4, and be installed within the housing 504 of the light assembly 500. The enclosure 512 may be affixed to the housing 504 in such a way as to modify the appearance of light produced by the light source 400. For example, the enclosure 512 may be a translucent or semi-transparent globe covering the light source 400.

In some embodiments, the light source 400 may be replaceable. For example, to replace the light source 400, the enclosure 512 may be removed by rotating the enclosure 512 in the direction of the arrow 520 in relation to the housing 504, as illustrated in FIG. 5A. The light source 400 may then be removed or replaced by pulling the light source 400 out and away from the housing 504 and inserting a new light source 400 in its place, as illustrated in FIG. 5B. The enclosure 512 may then be replaced by rotating the enclosure 512 in the direction of the arrow 524 in relation to the housing 504, as illustrated in FIG. 5C.

Figure 6:
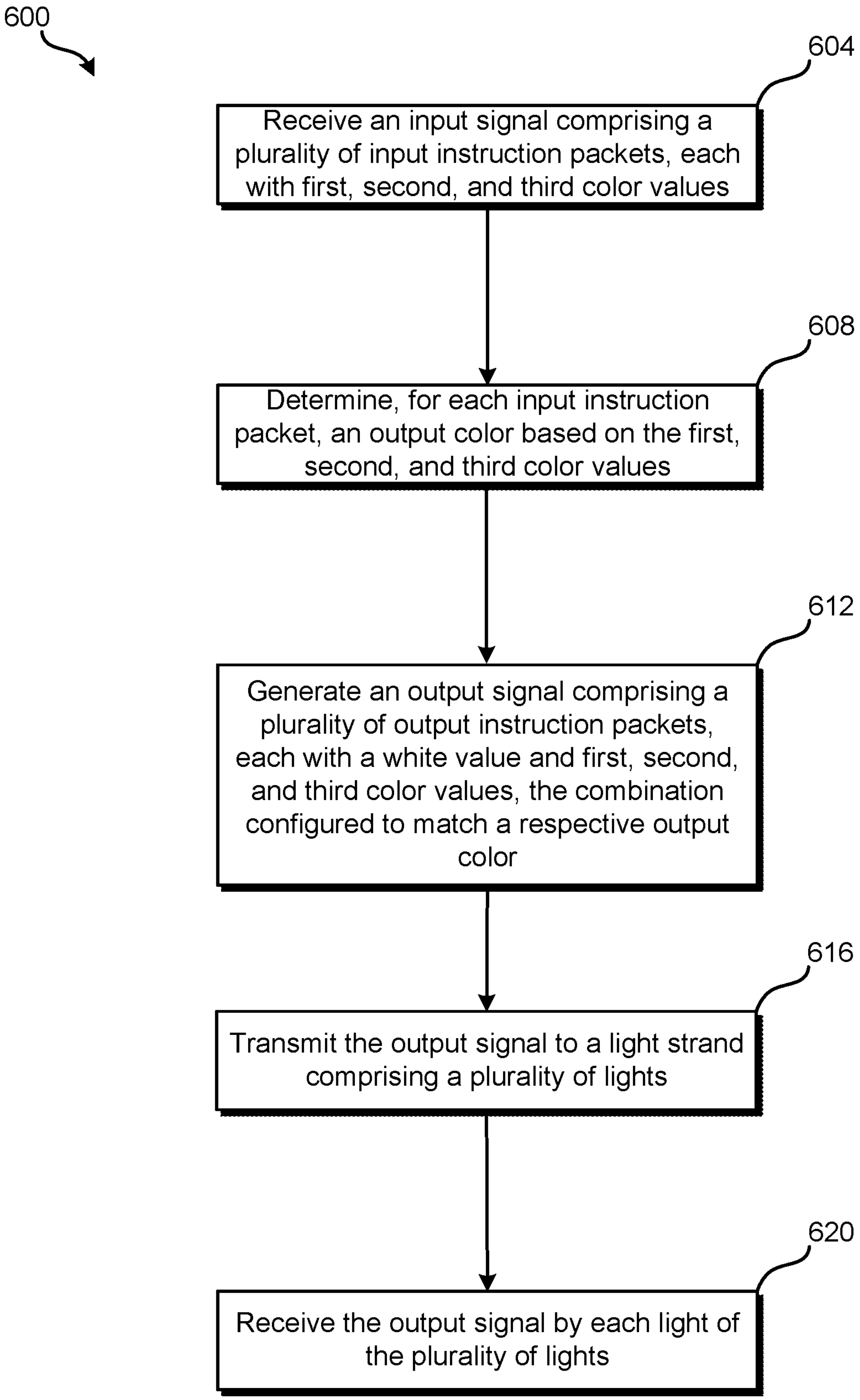
FIG. 6 illustrates an embodiment of a method for controlling Light Emitting Diode (LED) lights using three channels.

Various methods may be performed using the systems described in relation to FIGS. 1-3 to control LED lights using three channels. FIG. 6 illustrates an embodiment of a method 600 for controlling LED lights. In some embodiments, method 600 may be performed by one or more components of a light control system, such as system 100 as described above in relation to FIG. 1. For example, one or more processors of data box 112 may perform some or all of the steps of method 600. In some embodiments, the steps are stored as processor readable instructions on a non-transitory computer-readable medium. For example, method 600 may be implemented and stored as software instructions in a memory of data box 112.

Method 600 may include, at block 604, receiving an input signal. In some embodiments, the input signal may be received from a lighting control interface and/or a computer. For example, a computer, such as computer 128, may transmit a lighting instruction to a lighting control device, such as data box 112, through one or more additional components, such as network device 124 and lighting control interface 120, as described above in relation to FIG. 1. In some embodiments, the input signal comprises a plurality of input instruction packets. For example, a processor of a light control device, such as data box 112 as described in relation to FIG. 1 above, may receive the plurality of input instruction packets as an asynchronous serial data stream according to the DMX512 protocol via one or more inputs and/or wires. In some embodiments, each input instruction packet comprises a first color value, a second color value, and a third color value. For example, the first color value may comprise a magnitude for a red color, the second color value may comprise a magnitude for a green color, and the third color value may comprise a magnitude for a blue color. In some embodiments, each input instruction packet further comprises an address. For example, the address may be a unique address of a specific light coupled to the light control device, such as light 108 as described above in relation to FIG. 1.

At block 608, an output color may be determined for each input instruction packet of the input signal based on the color values of each input instruction packet. In some embodiments, the desired or otherwise intended output color may be represented as a combination of the color values. For example, a lighting instruction may include one or more values corresponding to the intensity of one or more colors, such as red, green, and blue. In some embodiments, a data box, such as data box 112, as described above in relation to FIGS. 1-3, may determine an output color based on the color values from an instruction packet. For example, decoder 316 of data box 112 may determine, based on a combination of three color values, one for red, one for green, and one for blue, that the desired or intended output color is pink, teal, purple, or other color perceivable by the human eye. In some embodiments, a combination of color values will be determined to correspond with a desired output of white. For example, when each color value, red, green, and blue, is equal and/or at a maximum value, the desired or intended output may be determined to be white.

At block 612, an output signal may be generated. In some embodiments, after determining the desired output colors for each input instruction packet from the color values of each input instruction packet of the input signal, an output signal comprising a plurality of output instruction packets will be generated. Each output instruction packet may comprise a first color value, a second color value, a third color value, and a white value. In some embodiments, the three color values and the white value are configured to produce the same or similar output color determined at block 608 when combined by a light, such as light 108, as described above in relation to FIG. 1. For example, when the output color for a respective input instruction packet is determined to be white, the white value of the respective output instruction packet will be a value greater than zero, and the remaining color values may be zero or close to zero. In some embodiments, each output instruction packet further comprises a value indicating a desired brightness setting of a light. For example, the value may be within a range of brightness settings where the minimum brightness setting produces very little light output, and the maximum brightness setting produces as much light output as a light source is capable of producing. In some embodiments, each output instruction packet further comprises an address. For example, the address may correspond with a unique address of a light, such as light 108, as described above in relation to FIG. 1. The address may further indicate for which light, of a plurality of lights, a particular output instruction packet is configured, such that only the light with the corresponding address will illuminate in accordance with the particular output instruction packet. In some embodiments, the output signal is generated by a lighting control device. For example, a data box, such as data box 112 as described above in relation to FIG. 1, may generate the output signal comprising the plurality of output instruction packets.

At block 616, the output signal may be transmitted to a light strand. In some embodiments, after generating the second instruction packet, it will be transmitted to a light strand. For example, a data box, such as data box 112, may transmit the second instruction packet to light strand 104, as described above in relation to FIG. 1. In some embodiments, the output signal comprising the plurality of output instruction packets will be transmitted to a light strand using a wired connection. For example, the plurality of output instruction packets may be transmitted over a wired connection using asynchronous serial data according to the DMX512 standard. In some embodiments, the method may end at the conclusion of block 616.

In some embodiments, at block 620, the method may further include receiving the output signal by each light of a plurality of lights. After receiving the output signal, each light may identify an output instruction packet of the plurality of output instruction packets addressed to an address of the respective light of the plurality of lights. After identifying the output instruction packet, each light may translate the color values of the output instruction packet into an RGB signal and a white signal. For example, the color values from each output instruction packet may be translated into the RGB signal while the white value is translated into the white signal. In some embodiments, the RGB and white signals are a collection of pulse width modulated electrical signals. For example, the RGB signal may comprise a red pulse width modulated signal, a green pulse width modulated signal, and a blue pulse width modulated signal, while the white signal is a white pulse width modulated signal. In some embodiments, translating the values into signals includes determining the appropriate duty cycle for a pulse width modulated signal based on the respective color or white value. For example, if the color and white values are selected from within a range of values, a value at the higher end of the range may correspond with a duty cycle of closer to 100%, while a value at the lower end of the range may correspond with a duty cycle closer to 0%. In some embodiments, after translating the values into the signals, the signals are transmitted to LEDs. For example, the RGB signal may be transmitted to an RGB LED, while the white signal may be transmitted to a white LED.

In some embodiments, the plurality of output instruction packets will have multiple sets of color values. For example, a first output instruction packet may have a first set of values configured for a first light, and a second output instruction packet may have a second set of values configured for a second light and so on. Further, each output instruction packet may be mapped and/or addressed to an address associated with a specific light. In some embodiments, after receiving the plurality of output instruction packets, each light will identify the output instruction packet from the plurality of output instruction packets addressed to the address of that particular light.

Figure 7:
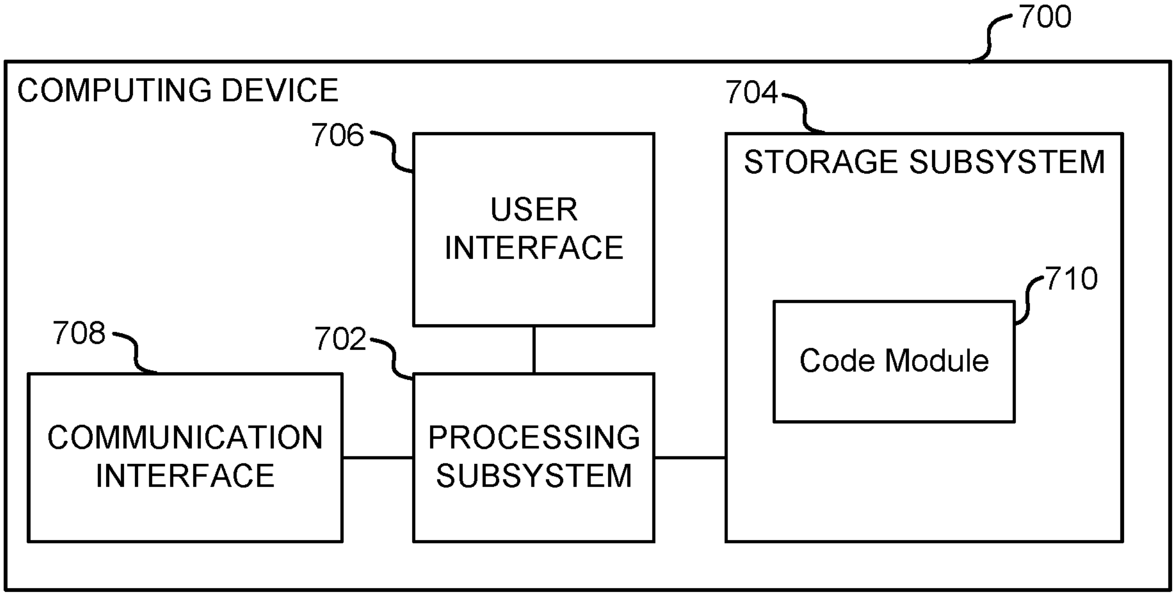
FIG. 7 depicts a block diagram of an embodiment of a computer system.

FIG. 7 is a simplified block diagram of a computing device 700. Computing device 700 can implement some or all functions, behaviors, and/or capabilities described above that would use electronic storage or processing, as well as other functions, behaviors, or capabilities not expressly described. Computing device 700 includes a processing subsystem 702, a storage subsystem 704, a user interface 706, and/or a communication interface 708. Computing device 700 can also include other components (not explicitly shown) such as a battery, power controllers, and other components operable to provide various enhanced capabilities. In various embodiments, computing device 700 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 704 can be implemented using a local storage and/or removable storage medium, e.g., using disk, flash memory (e.g., secure digital card, universal serial bus flash drive), or other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 704 can store one or more applications and/or operating system programs to be executed by processing subsystem 702, including programs to implement some or all operations described above that would be performed using a computer. For example, storage subsystem 704 can store one or more code modules 710 for implementing one or more method steps described above.

A firmware and/or software implementation may be implemented with modules (e.g., procedures, functions, and so on). A machine-readable medium tangibly embodying instructions may be used in implementing methodologies described herein. Code modules 710 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module 710) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 710 may comprise sets of instructions (codes) embodied on a computer-readable medium that directs a processor of a computing device 700 to perform corresponding actions. The instructions may be configured to run in sequential order, in parallel (such as under different processing threads), or in a combination thereof. After loading a code module 710 on a general purpose computer system, the general purpose computer is transformed into a special purpose computer system.

Computer programs incorporating various features described herein (e.g., in one or more code modules 710) may be encoded and stored on various computer-readable storage media. Computer-readable media encoded with the program code may be packaged with a compatible electronic device, or the program code may be provided separately from electronic devices (e.g., via Internet download or as a separately packaged computer-readable storage medium). Storage subsystem 704 can also store information useful for establishing network connections using the communication interface 708.

User interface 706 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 706 to invoke the functionality of computing device 700 and can view and/or hear output from computing device 700 via output devices of user interface 706. For some embodiments, the user interface 706 might not be present (e.g., for a process using an ASIC).

Processing subsystem 702 can be implemented as one or more processors (e.g., integrated circuits, one or more single-core or multi-core microprocessors, microcontrollers, central processing unit, graphics processing unit, etc.). In operation, processing subsystem 702 can control the operation of computing device 700. In some embodiments, processing subsystem 702 can execute a variety of programs in response to program code and can maintain multiple concurrently executing programs or processes. At a given time, some or all of a program code to be executed can reside in processing subsystem 702 and/or in storage media, such as storage subsystem 704. Through programming, processing subsystem 702 can provide various functionality for computing device 700. Processing subsystem 702 can also execute other programs to control other functions of computing device 700, including programs that may be stored in storage subsystem 704.

Communication interface 708 can provide voice and/or data communication capability for computing device 700. In some embodiments, communication interface 708 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 708 can provide wired connectivity (e.g., universal serial bus, Ethernet, universal asynchronous receiver/transmitter, etc.) in addition to, or in lieu of, a wireless interface. Communication interface 708 can be implemented using a combination of hardware (e.g., driver circuits, antennas, modulators/demodulators, encoders/decoders, and other analog and/or digital signal processing circuits) and software components. In some embodiments, communication interface 708 can support multiple communication channels concurrently. In some embodiments, the communication interface 708 is not used.

It will be appreciated that computing device 700 is illustrative and that variations and modifications are possible. A computing device can have various functionality not specifically described (e.g., voice communication via cellular telephone networks) and can include components appropriate to such functionality.

Further, while the computing device 700 is described with reference to particular blocks, it is to be understood that these blocks are defined for convenience of description and are not intended to imply a particular physical arrangement of component parts. For example, the processing subsystem 702, the storage subsystem 704, the user interface 706, and/or the communication interface 708 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 700.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A system for three channel Light Emitting Diode (LED) control, the system comprising:

a light strand comprising a plurality of lights, wherein:

each light of the plurality of lights comprises an RGB LED and a white LED;

each light of the plurality of lights is individually addressed;

each light of the plurality of lights is mounted in a separate housing; and each light of the plurality of lights is configured to:

receive an output signal comprising a plurality of output instruction packets, wherein:

each output instruction packet of the plurality of output instruction packets comprises a first color value comprising a magnitude for a red color, a second color value comprising a magnitude for a green color, a third color value comprising a magnitude for a blue color, and a white value comprising a magnitude for white;

translate the first color value of an output instruction packet of the plurality of output instruction packets into a red signal, the second color value of the output instruction packet of the plurality of output instruction packets into a green signal, the third color value of the output instruction packet of the plurality of output instruction packets into a blue signal, and the white value of the output instruction packet of the plurality of output instruction packets into a white signal; and transmit the red signal to a red input on the RGB LED, the green signal to a green input on the RGB LED, the blue signal to a blue input on the RGB LED, and the white signal to an input on the white LED;

a data box, wherein:

the data box is configured to:

receive an input signal comprising a plurality of input instruction packets, wherein:

each instruction packet of the plurality of input instruction packets comprises a first color value comprising a magnitude for a red color, a second color value comprising a magnitude for a green color, and a third color value comprising a magnitude for a blue color;

determine, for each input instruction packet of the plurality of input instruction packets, an output color based on the first color value, the second color value and the third color value;

generate the output signal comprising the plurality of output instruction packets, wherein:

a combination of the first color value, the second color value, the third color value, and the white value of each output instruction packet is configured to match the output color of each respective input instruction packet; and transmit the output signal to the plurality of lights; and a computer, wherein:

the computer is configured to:

receive input from a user;

generate, based on the input from the user, the input signal comprising the plurality of input instruction packets; and transmit the input signal to the data box.

2. A system for three channel Light Emitting Diode (LED) control, the system comprising:

a light strand comprising a plurality of lights; and a data box, wherein:

the data box is configured to:

receive an input signal comprising a plurality of input instruction packets, wherein:

each input instruction packet of the plurality of input instruction packets comprises a first color value, a second color value, and a third color value;

determine, for each input instruction packet of the plurality of input instruction packets, an output color based on the first color value, the second color value and the third color value;

generate an output signal comprising a plurality of output instruction packets, wherein:

each output instruction packet of the plurality of output instruction packets comprises a first color value, a second color value, a third color value, and a white value; and a combination of the first color value, the second color value, the third color value, and the white value of each output instruction packet is configured to match the output color of each respective input instruction packet; and transmit the output signal to the plurality of lights.

3. The system of claim 2, wherein:

the plurality of input instruction packets are asynchronous serial data packets according to a DMX512 protocol; and the first color value of each input instruction packet comprises a magnitude for a red color, the second color value of each input instruction packet comprises a magnitude for a green color, and the third color value of each input instruction packet comprises a magnitude for a blue color.

4. The system of claim 2, wherein the first color value of each output instruction packet comprises a magnitude for a red color, the second color value of each output instruction packet comprises a magnitude for a green color, the third color value of each output instruction packet comprises a magnitude for a blue color, and the white value comprises a magnitude for white.

5. The system of claim 2, wherein each light of the plurality of lights is individually addressable.

6. The system of claim 2, wherein each light of the plurality of lights comprises an RGB LED and a white LED.

7. The system of claim 2, wherein:

each light of the plurality of lights is mounted in a separate housing; and each housing has a separate transparent, or semi-transparent, enclosure.

8. The system of claim 2, wherein:

the light strand comprises four wires electrically coupling the plurality of lights in parallel with the data box; and the four wires comprise a plus wire, a minus wire, a clock wire, and a signal wire.

9. The system of claim 2, wherein:

the light strand is a first light strand;

the system further comprises a second light strand coupled with the first light strand; and the second light strand comprises a second plurality of lights.

10. The system of claim 2, wherein the data box is configured to receive the input signal from a personal computer based on a user input.

11. The system of claim 2, wherein the system further comprises a server in communication with the data box, the server being configured to receive the input signal from a personal computer and transmit the input signal to the data box.

12. The system of claim 2, wherein when the first color value, the second color value, and the third color value of an input instruction packet of the plurality of input instruction packets are each at a maximum value, then the first color value, the second color value, and the third color value of a corresponding output instruction packet are each zero, and the white value of the corresponding output instruction packet is greater than zero.

13. The system of claim 2, wherein each input instruction packet of the plurality of input instruction packets further comprises a brightness value indicating a desired output power for a light of the plurality of lights.

14. The system of claim 2, wherein each output instruction packet of the plurality of output instruction packets further comprises a brightness value, and wherein each light of the plurality of lights is configured to:

receive an output instruction packet of the plurality of output instruction packets; and translate the brightness value of the output instruction packet into a pulse width modulation value to be outputted by the light.

15. A method for controlling Light Emitting Diode (LED) lights using three channels, the method comprising:

receiving, by a processor of a light control system, an input signal comprising a plurality of input instruction packets, wherein:

each input instruction packet of the plurality of input instruction packets comprises a first color value, a second color value, and a third color value;

determining, by the processor for each input instruction packet of the plurality of input instruction packets, an output color based on the first color value, the second color value, and the third color value;

generating, by the processor, an output signal comprising a plurality of output instruction packets, wherein:

each output instruction packet of the plurality of output instruction packets comprises a first color value, a second color value, a third color value, and a white value; and a combination of the first color value, the second color value, the third color value, and the white value of each output instruction packet is configured to match the output color of each respective input instruction packet; and transmitting, by the processor, the output signal to a light strand comprising a plurality of lights.

16. The method of claim 15, wherein each output instruction packet further comprises an address of a light of the plurality of lights.

17. The method of claim 15, wherein each light of the plurality of lights comprises an RGB LED and a white LED and is configured to:

receive an output instruction packet of the plurality of output instruction packets from the processor;

translate the first color value of the output instruction packet into a red signal, the second color value of the output instruction packet into a green signal, the third color value of the output instruction packet into a blue signal, and the white value into a white signal; and transmit the red signal to a red input on the RGB LED, the green signal to a green input on the RGB LED, the blue signal to a blue input on the RGB LED, and the white signal to an input on the white LED.

18. The method of claim 17, wherein each of the red, green, blue, and white signals are pulse width modulated.

19. The method of claim 15, wherein the light strand comprises four wires electrically coupling the plurality of lights in parallel with the processor.

20. The method of claim 15, further comprising:

receiving, by a light of the plurality of lights, the plurality of output instruction packets;

identifying, by the light, an output instruction packet of the plurality of output instruction packets addressed to the light; and implementing, by the light, the output instruction packet addressed to the light while disregarding output instruction packets of the plurality of output instruction packets that are not addressed to the light.

* * * * *